United States Patent
Brown et al.

[19]

[11] Patent Number: 5,936,629
[45] Date of Patent: Aug. 10, 1999

[54] ACCELERATED SINGLE SOURCE 3D LIGHTING MECHANISM

[75] Inventors: Patrick Richard Brown, Round Rock; Barry Lawrence Minor, Austin, both of Tex.

[73] Assignee: International Business Machines Corporation, Armonk, N.Y.

[21] Appl. No.: 08/753,136

[22] Filed: Nov. 20, 1996

[51] Int. Cl.⁶ .................................................. G06F 15/00
[52] U.S. Cl. ............................................................ 345/426
[58] Field of Search .............................................. 345/426

[56] References Cited

U.S. PATENT DOCUMENTS

| | | | |
|---|---|---|---|
| 4,709,231 | 11/1987 | Sakaibara et al. | 340/729 |
| 4,928,250 | 5/1990 | Greenberg et al. | 364/518 |
| 4,943,938 | 7/1990 | Aoshima et al. | 364/522 |
| 5,222,203 | 6/1993 | Obata | 395/126 |
| 5,305,430 | 4/1994 | Glassner | 395/127 |
| 5,313,568 | 5/1994 | Wallace et al. | 395/126 |
| 5,317,678 | 5/1994 | Okawara et al. | 395/126 |
| 5,361,100 | 11/1994 | Teece | 348/578 |
| 5,363,477 | 11/1994 | Kuragano et al. | 395/126 |
| 5,369,737 | 11/1994 | Gholizadeh et al. | 395/126 |
| 5,377,313 | 12/1994 | Scheibl | 395/122 |
| 5,488,700 | 1/1996 | Glassner | 395/126 |
| 5,499,323 | 3/1996 | Doi et al. | 395/126 |
| 5,544,291 | 8/1996 | Gilley et al. | 395/123 |
| 5,673,374 | 9/1997 | Sakaibara et al. | 345/426 |
| 5,742,292 | 4/1998 | Murata | 345/426 |
| 5,777,620 | 7/1998 | Billyard | 345/426 |

FOREIGN PATENT DOCUMENTS

| 3222078 | 3/1991 | Japan | G06F 15/72 |
|---|---|---|---|

*Primary Examiner*—Mark R. Powell
*Assistant Examiner*—Motilewa Good-Johnson
*Attorney, Agent, or Firm*—Sawyer & Associates; Volel Emile

[57] ABSTRACT

A system for determining the lighting conditions of objects illuminated by light sources. The system is adapted for use in a three-dimensional graphics system in which a scene is provided having one or more objects. Each object is made up of one or more polygons comprising one or more surfaces. Each surface is delimited by a plurality of vertices. One or more light sources are disposed within the scene. The inventive system determines lighting conditions such as color and intensity for each surface of each object taking into account ambient lighting conditions and each of the light sources in an accelerated manner relative to conventional approaches. In the illustrative embodiment, the inventive system first pre-computes a lighting condition for a vertex and provides a first value representative thereof. This value is stored to avoid the computational expense of re-computing same for each subsequent lighting condition evaluated for the vertex. The system next determines a direction of a light source relative to a direction of the vertex and provides a first indication with respect thereto if the light source is directed toward the vertex and a second indication otherwise. The first value is output as a lighting condition of the vertex if the second indication is provided. If not, reflections from the light source with respect to the vertex are evaluated if the first indication is provided and a second value representative thereof is generated. Thereafter, the first and second values are combined and output as a lighting condition of the vertex.

31 Claims, 4 Drawing Sheets

ACCELERATED SINGLE SOURCE 3D LIGHTING MECHANISM

FIELD OF THE INVENTION

The present invention relates to computing systems. More specifically, the present invention relates to systems and techniques for generating three-dimensional graphics imagery.

BACKGROUND OF THE INVENTION

Three-dimensional (3D) graphics systems are used in many applications including simulation trainers for aircraft and military vehicles, virtual reality applications, video games, and etc. Three-dimensional graphics systems are typically implemented on workstations and personal computers with 3D graphics hardware. The 3D graphics hardware often includes a graphics accelerator card which facilitates the creation and display of graphic imagery.

Three-dimensional graphic scenes are made up of a number of polygons which are delimited by a set of vertices. The scene is rendered as a collection of vertices or points. The vertices are combined to provide larger primitives such as triangles and etc. to create a surface. As each vertex is received from an application program, it has a set of attributes including: 1) material color, which describes the color of the object to which the vertex belongs; 2) a normal which describes the direction to which the surface is facing at that vertex; and 3) a position, a three-dimensional coordinate which describes where the vertex is located. In addition, the scene typically has a set of attributes including: 1) an ambient color, which essentially describes the amount of ambient light and 2) one or more individual light sources. One important task in 3D applications is to combine information for the vertices describing the surface (the material color, normal and position) with the information about the scene attributes, including the ambient color and the number and location of light sources, to produce a color for the object which accurately reflects the appearance of the object under real lighting.

Because this approach is computationally expensive, many applications limit the number of light sources used. Each light source has a number of properties associated with it including: 1) direction (a vector in the same sense as a normal vector) and 2) colors, including an ambient color, a diffuse color and a specular color. These are used to model different types of reflection from an object.

A number of computational models are known. One such model is referred to as 'OpenGL'. OpenGL is a graphics library which is an industry-standard 3D API (Application Programming Interface). OpenGL models three different types of reflection: ambient, diffuse and specular. 'Ambient' is the contribution of light from the scene. 'Diffuse' is the contribution of light that is reflected and scattered in all directions by an object. 'Specular' has to do with the color and intensity of the light used to control reflections.

When the attributes of all light sources and the attributes of the surfaces are known, one can begin to evaluate the lighting equation. Lighting is generally computed on a vertex by vertex basis for each surface. For the OpenGL lighting model, there are four components that contribute to the full lit color of a vertex. The first is 'emissive'. 'Emissive' is a property of the material, a property of the surface itself. It is used generally to model surfaces which give off light. For example, the surface might reflect other light while giving off light of its own, such as a light in a ceiling panel. The contribution to the intensity at a vertex is the emissive color.

Each material has an ambient color, which is an RGB (red, green, blue) color. The scene has an ambient color and the lights have an ambient color. The ambient contributions of the scene and the lights all shine on the surface and are reflected by the surface. The ambient color of the scene and each light and the intensity of the ambient material color with respect to reflectivity determine the brightness of the reflected image due to ambient lighting. Hence, for example, the red components are multiplied together, the green components are multiplied together and the blue components are multiplied together. The components computed for each light source are then summed at each vertex to determine the total amount and color of ambient light reflected.

The 'diffuse' parameter refers to OpenGLs modeling of direct illumination from the light sources. As light strikes the surface it is scattered in all directions. Dull surfaces are mainly diffuse, a function of the intensity of the lights and the intensity of the surface with respect to its reflectivity. Hence, black surfaces will reflect less than a white surface. The degree of reflection is also a function of the angle of the incident light.

Evaluation of diffuse surfaces begins with a dot product between the normal at a vertex and the light direction. The dot product is a well-known mathematical (geometric) construct by which the x components are multiplied together, then the y components, then the z components. The resulting products are added together to yield a number which represents an angle. As each vector is of unit length, the dot products will range between ±1, where '+1' means that the light strikes the surface directly, '0' means the light is parallel to the surface, and '−1' means the light is directly behind the surface. The dot product is used to control whether or not the product of the diffuse light and the diffuse material is seen from a given point of view. For example, if the dot product is negative, then the light is behind the object and there is no possibility of the light scattering off the surface of the object into the eye as the object is blocking the light.

To finish evaluating diffuse colors, the color components are multiplied together, and each is multiplied by the dot product. The components computed for each light source are then summed.

The 'specular' parameter refers to OpenGL's modeling of intense highlights that are reflected off of a surface. Again, if the dot product evaluated above is negative, there is no specular reflection as well as no diffuse reflection. If the light is in front of the object and the normal vector is halfway between the direction of the light and the direction to the eye, then the reflection is 'ideal' as the angle of incidence matches the angle of reflection. Computationally, the average of the light direction vector and the eye direction vector is computed to ascertain a 'half-vector'. If the half-vector is lined up perfectly with the normal, then the reflection is deemed to be ideal and the reflection of light is perfect into the eye. In other words, the reflection is perfect if the angle of reflection is equal to the angle of the eye vector. In any event, the model takes into account three directions, the light direction, the normal of the surface and the direction to the eye from the surface.

The specular contribution is evaluated first by taking the dot product and multiplying the colors again to determine the color of the reflected light. The dot product is raised to a power which may be specified by the user. If the power is very large, the exponentiation will make specular highlights small unless the dot product is close to the ideal reflection of 1. For example, if the dot product is ½, and it is raised to high powers, say 50 or 100, then the specular contribution will be close to zero.

Hence, there are four calculations to be made for each illumination source. For emissive, there is simply a particular value to be associated with the source. For ambient, colors are multiplied. To evaluate diffuse, a dot product is evaluated, then colors are multiplied together and then the colors are multiplied with the dot product. For specular contributions, if the object is not blocking the source, then another dot product is evaluated, an exponent is taken, and the colors are multiplied together and then, by the exponentiated dot product, the four values are then summed to produce a final color.

Although the graphics hardware uses fixed point arithmetic, all of the calculations are typically performed in floating point arithmetic. That is, after evaluating the lighting calculations, an RGBA color is determined using floating point arithmetic. This information is typically provided from a processor to a graphics accelerator card and includes the location of each of the vertices (x, y, and z (transformed)) and the RGB color information (r, g, b, and $\alpha$, where $\alpha$ is a parameter which relates to transparency). The color information is typically provided to the graphics accelerator as a packed (fixed point output) 32-bit value for each vertex.

In some applications, a number of the required processing steps is performed by a graphics accelerator card. Within the processor, vertices and attributes are provided by an application program along with lighting parameters through a standard programming interface, such as the OpenGL library. The vertices are transformed by the processor or the graphics hardware, depending on the system, and input to a lighting unit. In the lighting unit, the transformed lighting parameters are evaluated with respect to the emissive, ambient, diffuse and specular features in floating point arithmetic. Next, these values are added and converted to fixed point arithmetic. The resulting polygons are clipped and sent to the hardware. The lighting unit thereby outputs vertices with packed colors.

As a result, the conventional technique for performing lighting calculations in computer generated full color 3D applications is computationally expensive. Hence, a need exists in the art for a system and technique for reducing the computational complexity of the lighting calculations.

SUMMARY OF THE INVENTION

The need in the art is addressed by the present invention which provides a system for determining the lighting conditions of objects illuminated by light sources. The invention is adapted for use in a three-dimensional graphics system in which a scene is provided having one or more objects. Each object is made up of one or more polygons comprising one or more surfaces. Each surface is delimited by a plurality of vertices. One or more light sources are disposed within the scene as well. The inventive system determines lighting conditions such as color and intensity for each surface of each object taking into account ambient lighting conditions and each of the light sources in an accelerated manner relative to conventional approaches. In the illustrative embodiment, the inventive system first pre-computes a lighting condition for a vertex and provides a first value representative thereof. This value is stored to avoid the computational expense of re-computing same for each subsequent lighting condition evaluated for the vertex. The system next determines a direction of a light source relative to a direction of the vertex and provides a first indication with respect thereto if the light source is directed toward the vertex and a second indication otherwise. The first value is output as a lighting condition of the vertex if the second indication is provided. If not, reflections from the light source with respect to the vertex are evaluated if the first indication is provided and a second value representative thereof is generated. Thereafter, the first and second values are combined and output as a lighting condition of the vertex.

In a specific implementation, the system assumes diffuse and specular lighting contributions at the vertex to be zero. Emissive and ambient lighting colors are then evaluated and summed using floating point arithmetic. The sum is clamped, converted to fixed point, packed and stored for later use. The system then computes a dot product between the direction of each vertex and the direction of each light source. If the dot product is negative, the system outputs the stored value for the emissive and ambient colors. If the dot product is positive, the system evaluates the diffuse and specular lighting conditions and outputs the results along with the stored value for the emissive and ambient conditions as the color condition for the vertex.

DETAILED DESCRIPTION OF THE INVENTION

The present invention relates to a system for determining the lighting conditions of objects illuminated by a light sources. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

As mentioned above, in a 3D graphics system, rendering software is frequently used to perform lighting calculations to determine the colors of objects illuminated by light sources. These computations are numerically intensive and can produce a significantly lower level of performance relative to rendering unlit primitives. Lighting calculations are typically done in floating-point arithmetic, and the results must be clamped and converted prior to being stored as pixels in fixed-point graphics hardware. Because of the computational expense of lighting, many (if not most) application programs limit the number of light sources to obtain higher overall performance.

Optimizing a rendering pipeline to light primitives quickly will produce better overall performance. Optimizations can come in a number of forms: faster floating-point processing, special-purpose instruction sets, or improved or specialized algorithms. In accordance with the present teachings, optimizations specific to environments with a small number of light sources are taught to produce performance increases obtainable by the majority of 3D graphics applications. The present invention provides a specific acceleration for surfaces illuminated by a small number of sources.

In a standard 3D graphics pipeline, the lit color of a surface consists of four components:

1. Emissive Material: The emissive material color is a property of the surface being rendered. This is used to model surfaces which are actual lights. The surface is assumed to emit light of a given color that radiates in all directions. A black emissive material corresponds to a surface that emits no light.
2. Ambient Illumination: Ambient illumination models indirect lighting where an object is illuminated by a light source that does not necessarily shine on it directly. For example, outdoor objects are not completely dark even when they are shaded from the sun because some sunlight is reflected in the atmosphere and reaches the object indirectly.
3. Diffuse Illumination: Diffuse illumination models direct lighting where incoming rays of light strike the surface being illuminated and are reflected in all directions. Light shining directly onto a surface will produce a bright reflection; light shining at a sharp angle will produce a dim reflection. Light from behind a surface will generate no reflection.
4. Specular Illumination: Specular illumination models direct lighting where incoming rays of light strike the surface being illuminated and are reflected directly at the viewer. A shiny surface such as a mirror or a steel ball will generate a very bright reflection, but only if viewed at the right angle.

Each surface consists of a number of vertices (points on the surface), each of which has an associated surface normal. The surface normal specifies the direction the surface points at the given vertex. Using the vertex position and the normal, the four components are computed and added together to produce an overall illumination for each vertex, which is passed to the remainder of the graphics hardware to be used when the surface is drawn.

The present invention exploits two properties of the lighting model. First, if a surface points away from a light source, it will generate no diffuse or specular reflections from that light source. For randomly distributed data, this will occur approximately half the time. Second, if material properties are constant over a surface, the emissive and ambient components of the lighting calculation are constant over the entire surface. Combining these two properties, if there is only one light source, the constant emissive and ambient components of the lighting calculation will be the only contributions to the final lit color for all vertices where the surface points away from the single light.

In brief, the invention pre-computes a lit color where the diffuse and specular contributions are assumed to be zero. The four components (red, green, blue, alpha) of the computed color are clamped and converted into a fixed-point representation. The four color components are then packed in a format native to the underlying graphics hardware. The resulting packed color is stored in a dedicated register in the graphics pipeline for future use.

As each vertex is lit, a vector dot product is taken between the surface normal and the light direction vector, which specifies the direction from which the light originates. This dot product is equivalent to the cosine of the angle between the light direction and the surface normal. If the dot product is positive, the diffuse contribution is computed, followed by any applicable specular contribution. If the dot product is negative, the surface points away from the light source so there is no diffuse or specular contribution. In this case, the pre-computed emissive and ambient color is used directly from the register in which it is stored.

Figure 1:
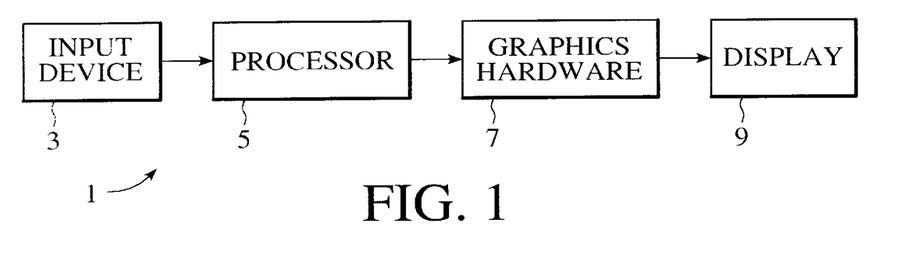
FIG. 1 is a block diagram of a 3D graphics system incorporating the teachings of the present invention.

FIG. 1 is a block diagram of a 3D graphics system incorporating the teachings of the present invention. The system 1 includes an input device 3 which might be a keyboard, memory, peripheral storage device, or communications port. The input device communicates data to a processor 5 which typically includes a central processing unit (CPU), read-only memory (ROM), random access memory (RAM), math coprocessors and other devices connected to common address and data buses as is well known in the art. Graphics hardware 7 is connected to the address and data bus and serves to assist the CPU and coprocessor, if present, in the computation required for the display of a three-dimensional graphics scene on a display 9.

Figure 2:
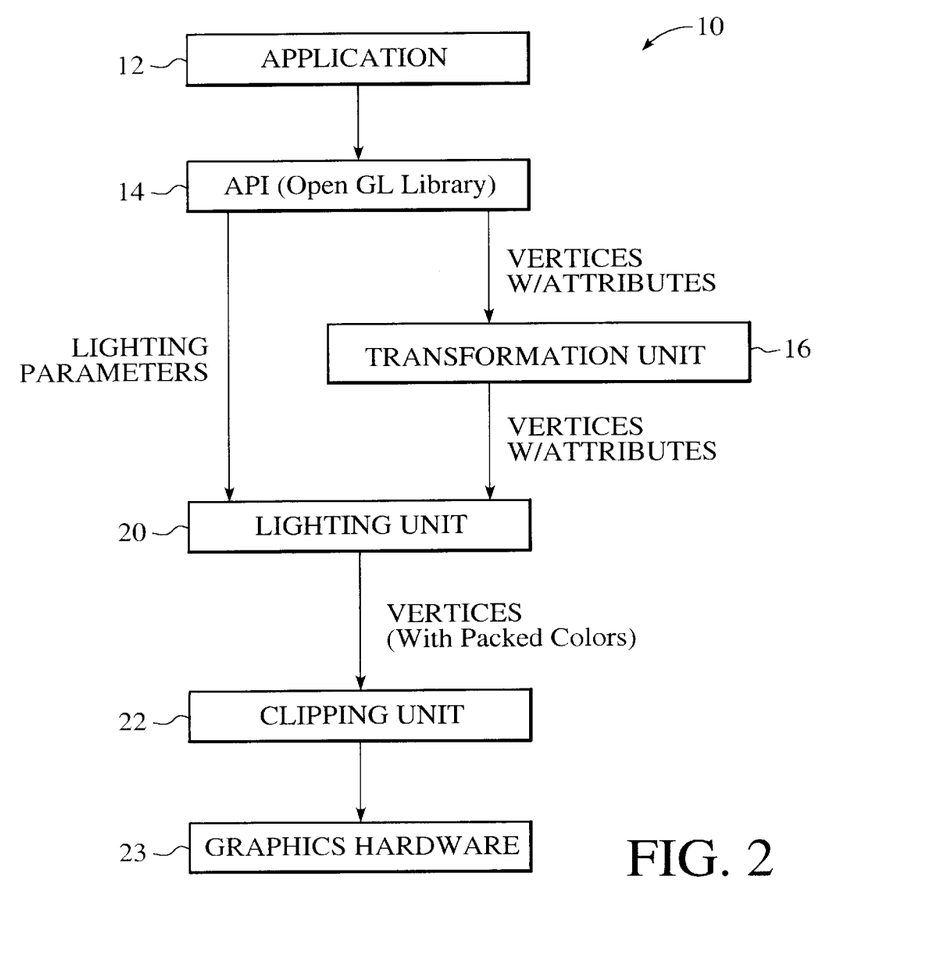
FIG. 2 is a diagram which illustrates the operations performed by the processor and/or graphics hardware of the system of FIG. 1.

FIG. 2 is a diagram 10 which illustrates the operations performed by the processor and/or graphics hardware of the system of FIG. 1. As shown in FIG. 2, a software application 12, which may be running on the processor or external thereto, generates a three-dimensional graphics scene and provides the scene along with lighting attributes to an application programming interface (API) 14. Three-dimensional graphic scenes are made up of a number of polygons which are delimited by a set of vertices. The scene is rendered with a collection of vertices or points. The vertices are combined to provide larger primitives such as triangles and etc. to create a surface. As each vertex is received from an application program, it has a set of attributes including material color, which describes the color of the object to which the vertex belongs; a normal which describes the direction to which the surface is facing at that vertex; and a position, a three-dimensional coordinate which describes where the vertex is located. In addition, the scene typically has a set of attributes including: 1) an ambient color which essentially describes the amount of ambient light and 2) one or more individual light sources. Each light source has a number of properties associated with it including direction (a vector in the same sense as a normal vector), an ambient color, a diffuse color and a specular color. These are used to model different types of reflection from an object.

In the illustrative implementation, the API 14 is an OpenGL Library. As mentioned above, OpenGL models three different types of reflection: ambient, diffuse and Specular. The API passes vertices and normals to a transformation unit 16. The transformation unit 16 projects the 3D vertices positions on the two-dimensional display. The API 14 also passes lighting information to a lighting unit 20. The lighting unit 20 utilizes the attributes of the light sources and the attributes of the surfaces to determine the color corresponding to each vertex. This information is output, typically in packed 32 bit form, to a clipping unit 22. As is well known in the art, the clipping unit 22 assembles transformed vertices into polygons and fits the polygons into the visible portion of the screen. The clipping unit 22 then passes the information on to the display 9 via graphics hardware 23.

Figure 3:
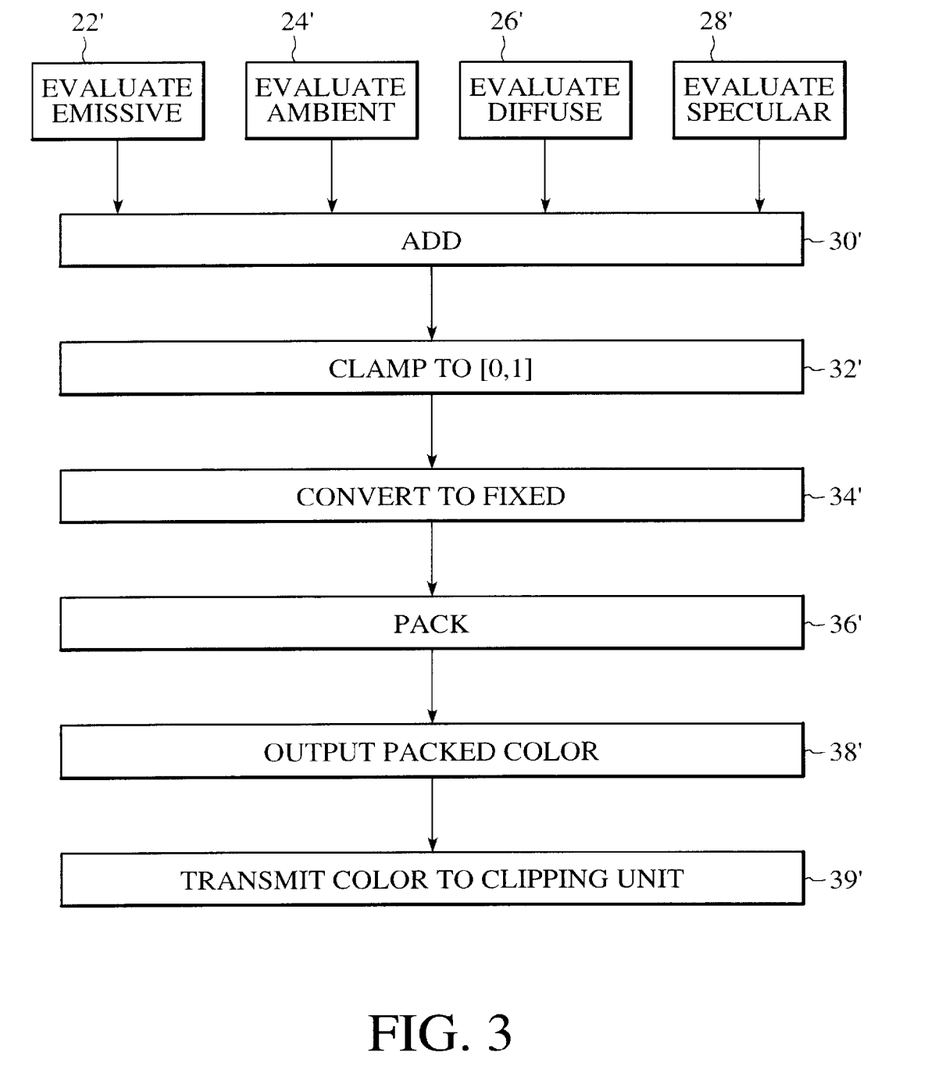
FIG. 3 is a block diagram which illustrates a conventional method for determining lighting conditions.

FIG. 3 is a block diagram which illustrates a conventional method for determining lighting conditions. As illustrated in FIG. 3, in previous 3D pipelines, lit colors have been computed by evaluating each of the four components of the lighting equations. Thus, for each vertex and for each light source in a scene, emissives are evaluated at step 22', ambient color is evaluated at step 24', diffuse color is evaluated at step 26', and specular color is evaluated at step 28'. The resulting values are added in floating point arithmetic at step 30', clamped at step 32' and converted to fixed point arithmetic at step 34'. The converted values are packed at step 36' and transmitted to a clipping unit at steps 38' and 39'. (As is known in the art, floating-point color intensities computed may be darker or brighter than the darkest or brightest color representable by graphics hardware. A floating-point intensity of 0.0 corresponds to the darkest representable color; 1.0 corresponds to the brightest representable color. In the clamping step, any computed intensities less than 0.0 are converted to the '0.0' level and any values greater than 1.0 are converted to the '1.0' level.) Such implementations may avoid computing the diffuse and specular contributions by assuming them to be to zero when surface normals point away from the light source. However, the final color (obtained at step 30') is generally still clamped and converted to the native fixed point representation per vertex, which is itself an expensive operation.

In prior OpenGL implementations on the Power PC processor, obtaining the emissive color required three floating-point loads. Adding in the ambient color required three floating-point multiply-add operations. If the dot product for diffuse illumination is negative (implying no diffuse and specular contributions), four floating-point instructions, four stores, and four loads are required to convert the four-component floating-point color into the required fixed-point representation. Additional cycles may also be required to clamp the floating-point values to a specified range prior to conversion to fixed point. Three fixed-point operations are required to pack the four fixed-point values into a single word.

As explained more fully below, when the dot product is negative, the pre-computed packed color is loaded from a dedicated register to save as many as twenty-one instructions per vertex in the illustrative embodiment. Thus, the present method is more efficient in that the pre-computed color needs to be reevaluated only when lighting or material properties change. Since these changes are infrequent, it is assumed that the cost of this operation (the twenty-one or more aforementioned instructions) is amortized over a large number of vertices. Expecting the dot product to be negative roughly half of the time, the net expected savings from this algorithm is ten and a half instructions per vertex.

Figure 4A:
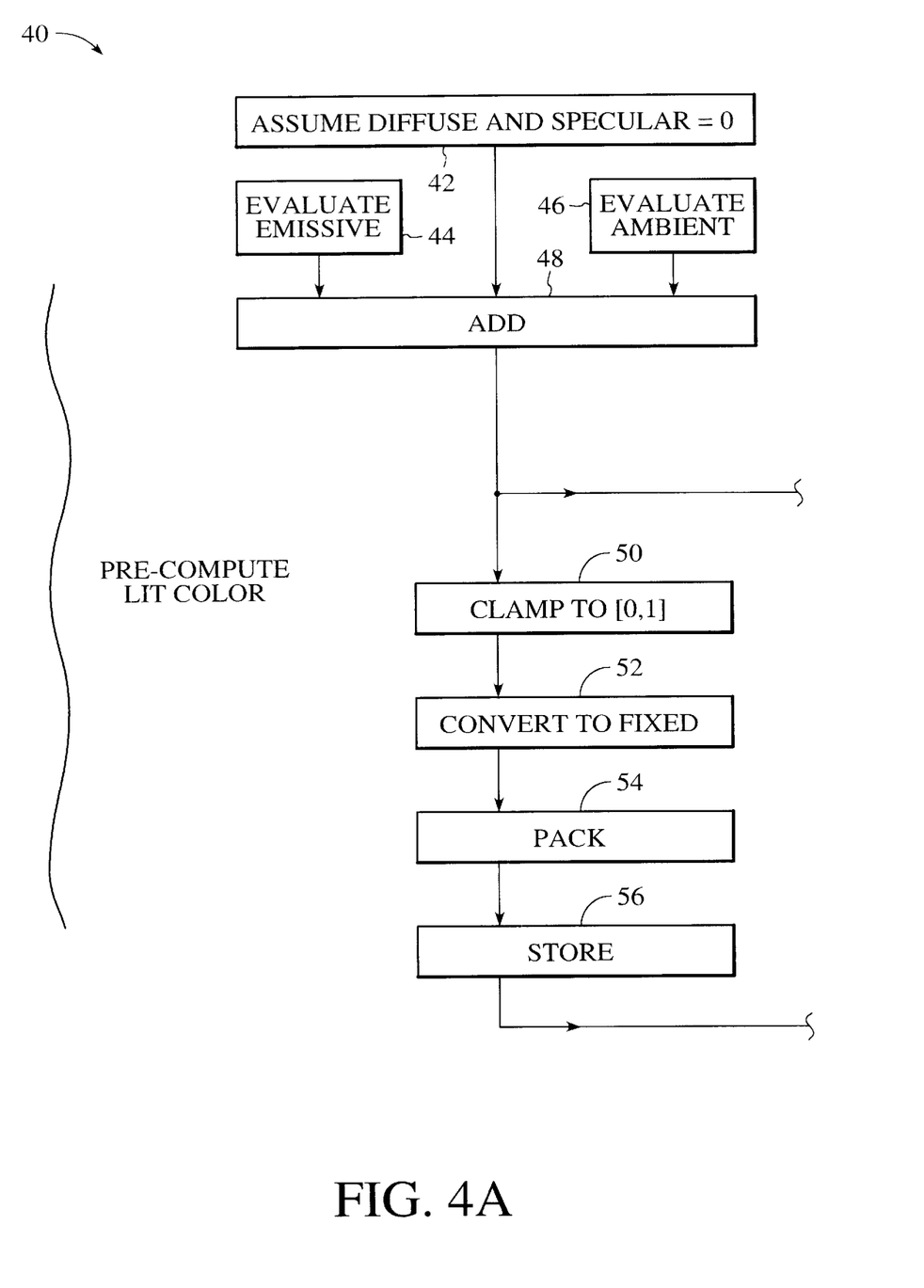
FIG. 4 is a block diagram which illustrates the method of the present invention for determining lighting conditions in a three-dimensional graphics system.
Figure 4B:
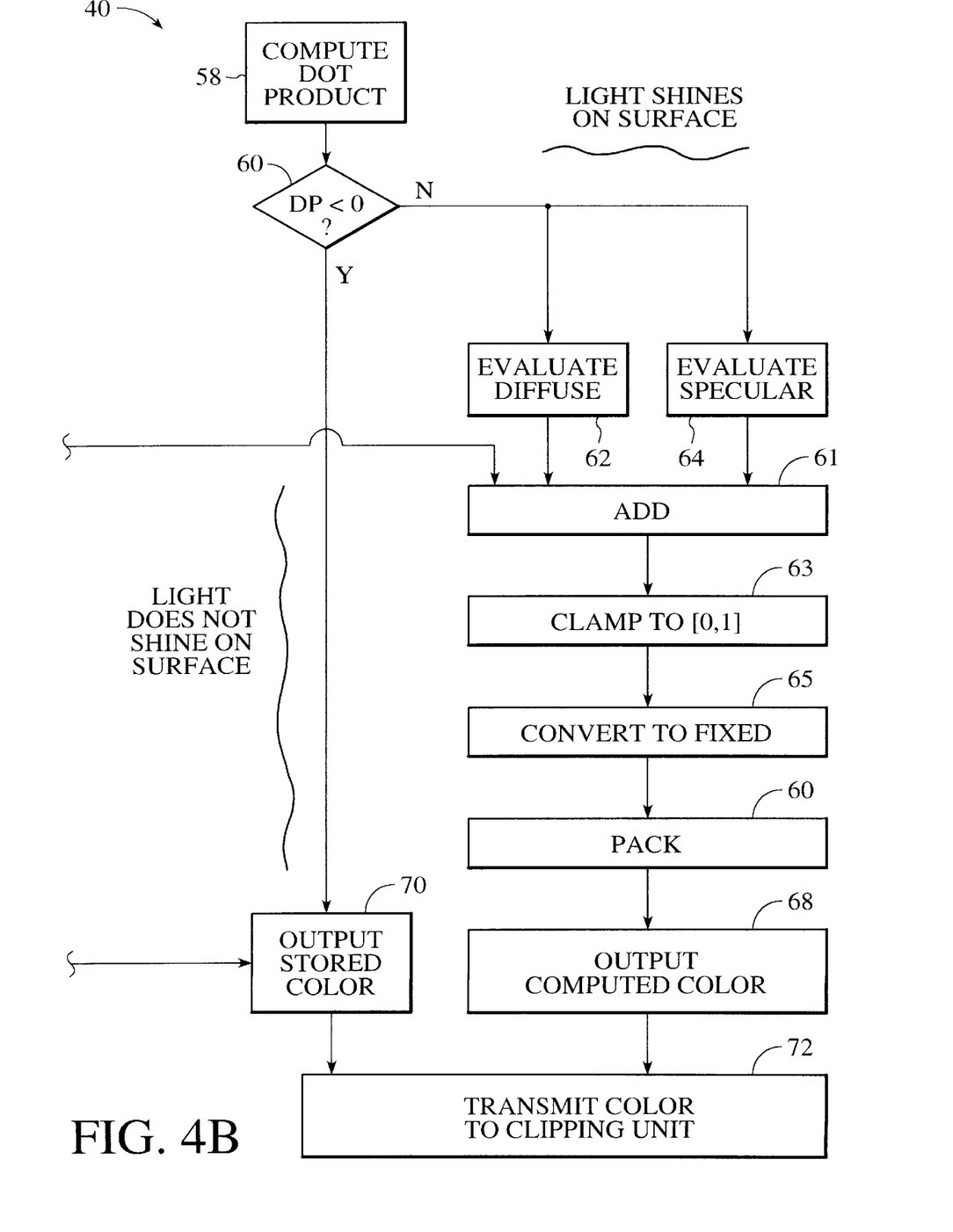

FIG. 4 is a block diagram which illustrates the method of the present invention for determining lighting conditions in a three-dimensional graphics system. As noted above, the invention 40 pre-computes a lit color where the diffuse and specular contributions are assumed to be zero. Emissive and ambient are typically constant over the entire surface so, next, the invention evaluates emissive and ambient lighting conditions for the subject surface. This is illustrated at steps 42, 44 and 46. The components are summed at step 48. The resulting four-component (RGBA or red, green, blue, alpha) color is clamped at step 50 and converted into a fixed point representation at step 52. At step 54, the four fixed point color components are packed in a format native to the underlying graphics hardware. In the illustrative implementation, packing involves converting the outputs of four eight bit registers into a 32-bit word. At step 56, the resulting packed color is stored in a dedicated register in the graphics pipeline for future use.

Next, at step 58, as each vertex in the scene is analyzed or 'lit', a vector dot product is taken between the surface normal and the light direction vector, which specifies the direction from which the light originates. This dot product is equivalent to the cosine of the angle between the light direction and the surface normal. At step 60, the dot product is tested. If the dot product is positive, light shines on the surface. Hence, at step 62, the diffuse contribution is computed in floating point arithmetic, followed by an evaluation in floating point of any applicable specular contribution at step 64. The diffuse and specular contributions are combined with the floating point representations of the emissive and ambient contributions at step 61, clamped at step 63, converted to fixed at step 65 and packed at step 66. The packed representations of the diffuse, specular, emissive and ambient contributions are output at step 68 as the color condition of the vertex and transmitted to a clipping unit at step 72.

If the dot product is negative, the surface points away from the light source so there is no diffuse or specular contribution. In this case, at step 70, the pre-computed emissive and ambient color is used directly from the register in which it is stored and, at step 72, transmitted to a clipping unit.

Knowledge of the lighting conditions at each vertex allows for the color of a surface defined by the vertices to be determined as is well known in the art.

It should be noted that in accordance with the present teachings, packing is performed only once for all the vertices for which the pre-computed ambient and emissive parameters apply. Whereas in prior methods, packing was performed repeatedly for each vertex, even for those cases when the diffuse dot products are negative. As packing typically requires 15 operations, those skilled in the art will appreciate the efficiency afforded by the present invention.

The invention teaches pre-computing the lit color for surfaces pointing away from a light source, storing the result and using it for the other surfaces that point away from the source.

Although the system and method has been described in accordance with the embodiments shown, one of ordinary skill in the art will readily recognize that there could be variations to the embodiments and those variations would be within the spirit and scope of the above-described system and method. Accordingly, many modifications may be made by one of ordinary skill in the art without departing from the spirit and scope of the appended claims.

Accordingly,

What is claimed is:

1. A system for determining the lighting conditions of objects illuminated by light sources, for use in a three-dimensional graphics system having means for providing a three-dimensional graphics scene having one or more objects, each object comprising one or more surfaces delimited by a plurality of vertices, and one or more light sources; the system for determining lighting conditions including:

first means for pre-computing a lighting condition for a vertex and providing a first value representative thereof;

second means for determining a direction of a light source relative to a surface at the vertex and for providing a first indication with respect thereto if the light source is directed toward the surface and for providing a second indication otherwise;

third means for outputting the first value as a lighting condition of the vertex if the second indication is provided;

fourth means for evaluating reflections from the light source with respect to the vertex if the first indication is provided and providing a second value representative thereof; and fifth means for outputting the first and second values as a lighting condition of the vertex if the first indication is provided.

2. The invention of claim 1 wherein the first means includes means for initially assuming diffuse and specular lighting contributions at the vertex to be a constant.

3. The invention of claim 2 wherein the constant is zero.

4. The invention of claim 1 wherein the second means includes means for computing a dot product between the direction of each vertex and the direction of each light source.

5. The invention of claim 4 wherein the first indication is that the dot product is positive.

6. The invention of claim 5 wherein the second indication is that the dot product is negative.

7. A system for determining the colors of objects illuminated by light sources for use in a three-dimensional graphics system having means for providing a three-dimensional graphics scene having one or more objects, each object comprising one or more surfaces delimited by a plurality of vertices, and one or more light sources; the system for determining the colors including:

first means for evaluating emissive light with respect to a vertex and for evaluating ambient light with respect to the vertex and providing first and second numerical values with respect thereto, respectively, in a first arithmetic format, second means for adding the first and second numerical values to provide a sum, third means for storing the sum, fourth means for determining a direction of each light source relative to a surface at the vertex and for providing a first indication with respect thereto if the light source is directed toward the vertex and is not blocked thereby relative to a first point of view and for providing a second indication otherwise, fifth means for outputting the stored sum as the lit color of the vertex if the second indication is provided, sixth means for evaluating diffuse and specular reflections from the light source with respect to the vertex if the first indication is provided and providing third and fourth numerical representations with respect thereto, respectively, in the first arithmetic format, and seventh means for combining the first, second, third and fourth numerical values as the lighting color of the vertex if the first indication is provided.

8. The invention of claim 7 wherein the fifth means includes means for initially assuming diffuse and specular lighting contributions at the vertex to be a constant.

9. The invention of claim 8 wherein the constant is zero.

10. The invention of claim 7 wherein the first arithmetic format is floating point.

11. The invention of claim 7 wherein the fourth means includes means for computing a dot product between the direction of each vertex and the direction of each light source.

12. The invention of claim 11 wherein the first indication is the dot product is positive.

13. The invention of claim 12 wherein the second indication is the dot product is negative.

14. The invention of claim 7 including means for clamping the sum.

15. The invention of claim 14 including means for converting the sum to a form suitable for display.

16. The invention of claim 14 wherein the means for converting includes means for transforming the sum into a second arithmetic format.

17. The invention of claim 16 wherein the second arithmetic format is fixed point.

18. The invention of claim 14 including means for packing the first and second numerical values.

19. The invention of claim 18 including means for packing the first, second, third and fourth numerical values.

20. A system for determining the colors of objects illuminated by light sources in a three-dimensional graphics system comprising:

first means for providing a three-dimensional graphics scene having:
one or more objects, each object comprising one or more surfaces, each surface being delimited by a plurality of vertices and
one or more light sources;

second means for providing a plurality of attributes with respect to the vertices, surfaces, objects and light sources, for each vertex, the attributes including:
emissive, ambient, diffuse and specular material colors for the object to which the vertex belongs,
a normal vector specifying a direction at which a surface is facing at that vertex, and
a three-dimensional coordinate for the vertex, and for each scene, the attributes including:
ambient color and
a direction, ambient color, diffuse color and specular color for each light source therein;

third means for combining the attributes to produce a lit color for at least one vertex of one object, the third means including:
fourth means for evaluating emissive light with respect to the vertex and for evaluating ambient light with respect to the vertex and providing first and second numerical values with respect thereto, respectively, in a first arithmetic format, fifth means for adding the first and second numerical values to provide a sum, sixth means for converting the sum to a form suitable for display, and seventh means for storing the converted sum, eighth means for determining a direction of each light source relative to the direction of the vertex and for providing a first indication with respect thereto if the light source is directed toward the vertex and is not blocked thereby relative to a first point of view and for providing a second indication otherwise, ninth means for outputting the stored converted sum as the lighting color of the vertex if the second indication is provided, tenth means for evaluating diffuse and specular reflections from the light source with respect to the vertex if the indication is true and providing third and fourth numerical representations with respect thereto, respectively, in the first arithmetic format if the first indication is provided, and eleventh means for outputting the first, second, third and fourth numerical values as the lit color of the vertex if the first indication is provided.

21. The invention of claim 20 wherein the third means includes means for initially assuming diffuse and specular lighting contributions at the vertex to be a constant.

22. The invention of claim 21 wherein the constant is zero.

23. The invention of claim 20 wherein the first arithmetic format is floating point.

24. The invention of claim 20 wherein the eighth means includes means for computing a dot product between the normal vector at each vertex and the direction of each light source.

25. The invention of claim 20 wherein the attributes of each vertex include material color which describes the color of the object to which the vertex belongs, a normal which describes the direction to which the surface is facing at that vertex, and a location comprising a three-dimensional coordinate which describes where the vertex is located.

26. The invention of claim 20 wherein the attributes of the scene include an ambient color which describes the amount of ambient light and one or more individual light sources.

27. The invention of claim 26 wherein the attributes of each light source include direction, an ambient color, a diffuse color and a specular color.

28. The invention of claim 27 wherein the attributes of the light source and the surfaces are used to model reflection from an associated object.

29. The invention of claim 28 wherein reflection is modeled using ambient, diffuse and specular reflection.

30. The invention of claim 20 wherein the third means includes means for combining the attributes to produce a color for at least one object which accurately reflects an appearance of the object under real lighting.

31. A method for determining the lighting conditions of objects illuminated by light sources for use in a three-dimensional graphics system having means for providing a three-dimensional graphics scene having one or more objects, each object comprising one or more surfaces delimited by a plurality of vertices, and one or more light sources; the method for determining lighting conditions including the steps of:

pre-computing a lighting condition for a vertex and providing a first value representative thereof;

determining a direction of a light source relative to a direction of the vertex and for providing a first indication with respect thereto if the light source is directed toward the vertex and for providing a second indication otherwise;

outputting the first value as a lighting condition of the vertex if the second indication is provided;

evaluating reflections from the light source with respect to the vertex if the first indication is provided and providing a second value representative thereof; and outputting the first and second values as a lighting condition of the vertex if the first indication is provided.

\* \* \* \* \*